INVENTOR.
WALLACE E. HOLBROOK
BY
ATTORNEYS

Nov 1, 1949.    W. E. HOLBROOK    2,486,408
VENTILATING SHIELD FOR VENTILATING
WINDOWS ON AUTOMOBILES
Filed April 11, 1945    2 Sheets-Sheet 2
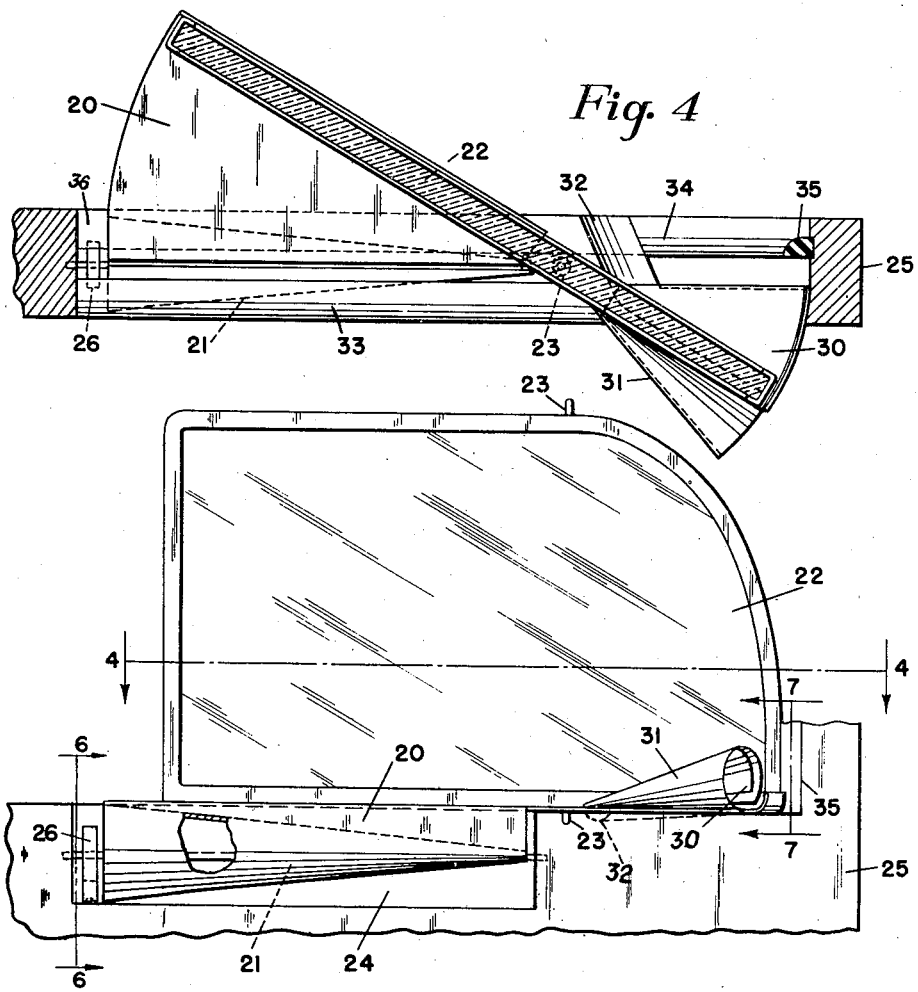
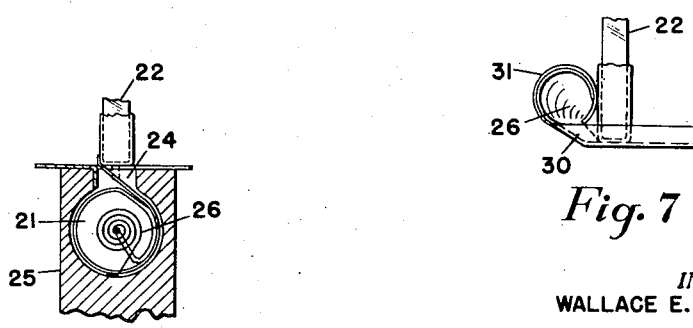
INVENTOR.
WALLACE E. HOLBROOK
BY
ATTORNEYS Patented Nov. 1, 1949

2,486,408

UNITED STATES PATENT OFFICE 2,486,408

VENTILATING SHIELD FOR VENTILATING WINDOWS ON AUTOMOBILES

Wallace E. Holbrook, Houston, Tex.

Application April 11, 1945, Serial No. 587,817

11 Claims. (Cl. 296—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to shields for use with ventilating windows on automobiles.

The conventional types of vent planes or window wings, now more or less standard equipment on passenger cars, consist of a pane of glass pivoted centrally thereof top and bottom, the pivot being forward of the center of the glass. On some automobiles, a guard is extended over the top of the pane to prevent rain from falling into the car.

When the wing is opened and the vehicle moves forward, air is sucked out of the car by the creation of a reduced pressure area at the rear of the pane, and air enters the car around the front of the wing due to the pressure developed there. This is the so-called "No draft ventilation." Under certain conditions, two objectionable events occur:

1. A very pronounced stream of air flows under the rear edge of the wing and projects uncontrolled into the vehicle, and, during cold weather becomes very noticeable and objectionable; and 2. Rain impinging upon the front face of the wing loses its momentum, and runs down the glass and off the wing. This constant drip from the portion extending into the car is very objectionable since the water either drops on the driver or passengers, or the door upholstery.

It is, accordingly, an object of my invention to overcome the above and other objectionable features in the ventilation of an automobile, and it is more particularly an object of my invention to provide a shield for disposal on the underside of a ventilating wing which is simple in construction, easy to install on new or old cars, efficient in operation against the admission of rain, dust, etc. in the automobile, and which is very simple in manufacture.

Another object of my invention is to provide a flexible shield for the under side of a ventilating wing disposed on reels for reeling upon closing of the ventilating wing.

Another object of my invention is to provide a shield for the underside of a ventilating wing which is in one piece and which has a drainage channel for draining water to the outside of the vehicle.

Other objects of my invention will become evident from the following detailed description, taken in conjunction with the accompanying drawings, in which:

Figure 4 is a view taken on the line 4—4 of Figure 5;

Figure 5 is a side elevational view with parts in section of my modified form of ventilating window shield;

Figure 6 is a fragmentary view taken on the line 6—6 of Figure 5, and

Figure 7 is a fragmentary view taken on the line 7—7 of Figure 5.

Figure 1:
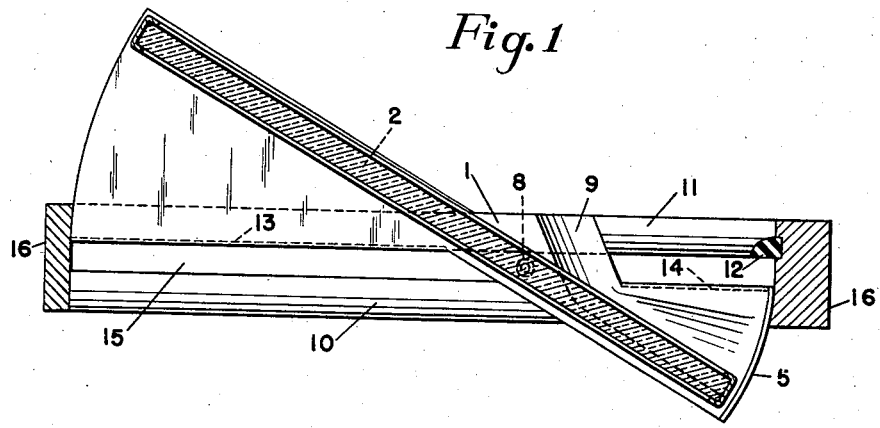
Figure 1 is a view taken on the line 1—1 of Figure 2.
Figure 2:
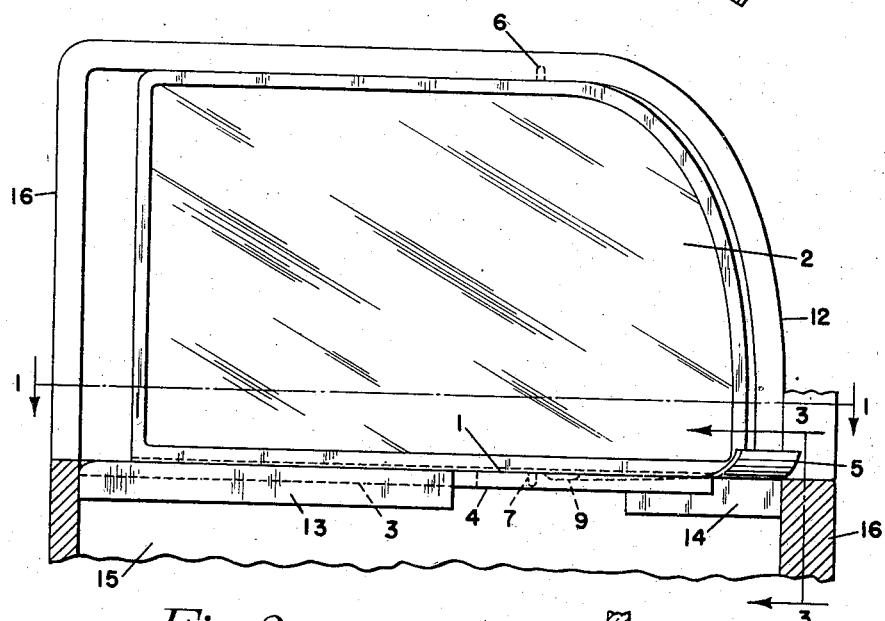
Figure 2 is a side elevational view of a ventilating wing with my novel shield disposed thereunder.
Figure 3:
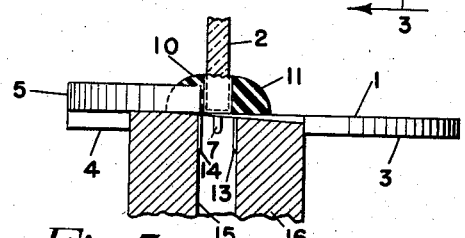
Figure 3 is an enlarged view taken on the line 3—3 of Figure 2.

Referring now to the drawings, Figs. 1, 2 and 3 show a flat plate or shield 1 disposed adjacent the bottom side of a ventilating window 2 of an automobile. The shield or plate 1 has depending flanges 3 and 4 for strengthening itself and an upwardly extending arcuate flange 5 on the forward part thereof to prevent water from passing to the floor of an automobile. The ventilating window 2 is pivoted on the pivots 6 and 7 forward of the central portion thereof. An aperture 8 is provided in the shield 1 for receiving the pivot pin 7. Shield 1 is in the form of opposing sectors of a circle on each side of the pivot pin 7 completely covering the area traversed by the bottom of the ventilating window in its opening and closing operation. A drainage channel 9 is provided in the forward part of the shield to drain water or the like to the outside of the automobile. Conventional rubber strips 10 and 11 and a vertically extending strip 12 engage the bottom and front portions of the ventilating window 2 when it is in a closed position. The large rear portion or sector of the shield 1 prevents cold air from flowing under the rear edge of the ventilating wing or window 2. The smaller front portion of the shield 1 prevents rain from running off the wing into the automobile. Depending flanges 13 and 14 extend into an aperture 15 in the door 16 to support the shield 1. This novel shield may be installed on old cars as well as new ones.

Figures 4, 5, 6 and 7 show a modified form of my invention. In this modification, a flexible shield 20 is disposed on a conical roller 21 with the free end attached to the bottom side of the ventilating window 22 rearwardly of the pivot pin 23. The conical roller member 21 is disposed in a recess 24 in the door 25 as shown in Figures 5 and 6, and a spring 26 constantly urges the shield 20 to a reeled position as when the ventilating window 22 is completely closed. A flexible sector 30 is disposed forwardly of the pivot 23 and is reeled within a conical shaped member 31 disposed on the lower forward part of the ventilating window 22.

The front flexible sector 30 is attached to the front portion of the window sill 36 by any suitable means and is provided with a drainage channel 32 to drain water or the like to the outside of the automobile. Suitable weather strips 33 and 34 and a vertically extending weather strip 35 are provided to engage the bottom and front portion of the ventilating window 22 when it is in a closed position. The shield material may be such that it will automatically roll within the conical member upon closing of the ventilating window 22 as shown by member 31.

In operation the ventilating window 22 is opened thereby pulling the flexible shields 20 and 30 from the conical members 21 and 31, whereby flexible shields 20 and 30 cover the area traversed by the bottom side of the ventilating window 22. When the ventilating window 22 is closed, the flexible shields 20 and 30 are automatically reeled respectively on the conical member 21 and within the conical member 31.

It will be evident from the foregoing that I have provided a shield adjacent to the bottom side of a ventilating window to prevent cold air from passing uncontrolled into the automobile and for removing rain water which has run off that portion of the ventilating window which extends into the vehicle.

Various changes may be made in the specific embodiment of my invention without departing from the spirit thereof or from the scope of the appended claims.

What I claim is:

1. In combination with a ventilating window for an automobile, said window having a centrally disposed pivot between the forward and rear portions thereof, said forward and rear portions extending respectively into and out from said automobile when said window is in pivotally opened position thereon, a shield disposed under and in contact with said window and comprising forward and rear flared out opposing sector portions extending from opposite forward and rear sides of said pivot, said forward and rear sector portions substantially covering respectively inwardly and outwardly of said automobile the area of the horizontal plane traversed by the bottom side of said window on pivotal movement of the latter.

2. A shield as set forth in claim 1 wherein a drain is provided in the forward flared out sector portion to drain water to one side of said shield.

3. In combination with a ventilating window for a window aperture, said window having a centrally disposed pivot, said window extending both inwardly and outwardly from said aperture when in pivotally opened position therein, a shield member disposed below said ventilating window flared outwardly in opposite directions from said pivot forming oppositely disposed sectors covering the horizontal plane traversed by the bottom of said window, and an upwardly extending flange on the forward part of said shield.

4. A shield as set forth in claim 3 wherein a drain is disposed in the forward arcuate sector of said shield.

5. A shield as set forth in claim 3 wherein depending flanges are provided for strengthening said shield.

6. In combination with a ventilating window disposed on a central pivot, a flexible shield adjacent the underside of said window comprising opposing sectors on opposite sides of said pivot adapted to cover the area in a horizontal plane traversed by the underside of said ventilating window, and a tubular member adjacent said window for reeling one of said sectors.

7. In combination with a ventilating window disposed on a central pivot in the door of an automobile, a flexible shield attached to said window rearwardly of said pivot, a roller disposed in said door for reeling the portion of said flexible shield rearwardly of said pivot, a tubular member disposed on said window forwardly of said pivot and a flexible shield portion adapted to be retained by said tubular member.

8. In combination with a ventilating window disposed on a central pivot in a window aperture having a sill, a flexible shield rearwardly of said pivot and attached to the bottom of said window, a conical reel for reeling said flexible shield disposed in said door, a shield disposed forwardly of said pivot and attached to the window sill in said door, and a tubular member disposed on the forward portion of said ventilating window for reeling the flexible shield disposed forwardly of said pivot.

9. In combination with a ventilating window disposed on a central pivot in an automobile door opening having a sill, a flexible shield disposed rearwardly of said pivot and attached to the bottom portion thereof, a conical member disposed in said door for reeling said flexible member, a flexible member disposed forwardly of said pivot and attached to the sill of said door opening, and a conical member disposed on the forward portion of said window for reeling said flexible member.

10. In combination with a ventilating window disposed on a central pivot, a shield for the underside of said window comprising a flexible sector member disposed on one side of said pivot, means for reeling said flexible sector member, and an additional sector member on the opposite side of said pivot, said sector members covering the area traversed by the underside of said window in a horizontal plane.

11. In combination with a ventilating window disposed on a centrally disposed pivot in a door having a window aperture with a longitudinally recessed sill, a shield member disposed below said ventilating window flared outwardly from said pivot in opposite directions forming oppositely disposed sectors covering the horizontal plane traversed by the bottom of said window, and depending support members extending into the recessed sill of said window aperture.

WALLACE E. HOLBROOK.

REFERENCES CITED

The following references are of record in the file of this patent:

UNITED STATES PATENTS

| Number | Name | Date |
|---|---|---|
| 402,604 | Mallory | May 7, 1889 |
| 1,844,427 | Kirchoff | Feb. 9, 1932 |
| 1,859,031 | Edwards | May 17, 1932 |
| 2,023,699 | Robinson | Dec. 10, 1935 |
| 2,060,109 | Parmenter | Nov. 10, 1936 |
| 2,290,449 | Ramsey | July 21, 1942 |
| 2,354,443 | Schirra | July 25, 1944 |
| 2,390,260 | King | Dec. 4, 1945 |